United States Patent
Masuda et al.

(10) Patent No.: US 7,423,759 B2
(45) Date of Patent: Sep. 9, 2008

(54) WAVELENGTH DETERMINING DEVICE, WAVELENGTH METER EQUIPPED WITH THE DEVICE, WAVELENGTH DETERMINING METHOD, PROGRAM, AND RECORDING MEDIUM

(75) Inventors: Shin Masuda, Miyagi (JP); Shoji Niki, Miyagi (JP)

(73) Assignee: Advantest Corporation, Tokyo (JP)

( * ) Notice: Subject to any disclaimer, the term of this patent is extended or adjusted under 35 U.S.C. 154(b) by 346 days.

(21) Appl. No.: 11/388,983

(22) Filed: Mar. 27, 2006

(65) Prior Publication Data

US 2006/0221344 A1    Oct. 5, 2006

(30) Foreign Application Priority Data

Mar. 31, 2005    (JP)    ............................ 2005-103253

(51) Int. Cl.
*G01B 9/02*    (2006.01)
(52) U.S. Cl. ........................................ 356/450; 356/484
(58) Field of Classification Search ................ 356/451, 356/484, 454; 372/32
See application file for complete search history.

(56) References Cited

U.S. PATENT DOCUMENTS

| | | | | |
|---|---|---|---|---|
| 6,115,122 A * | 9/2000 | Bao et al. | .................... | 356/480 |
| 6,594,019 B1 * | 7/2003 | Ichikawa et al. | ............. | 356/451 |
| 6,633,371 B1 * | 10/2003 | Lu et al. | ........................ | 356/72 |
| 2001/0033385 A1 * | 10/2001 | Unno et al. | ................... | 356/451 |
| 2002/0149776 A1 * | 10/2002 | Braun et al. | ................. | 356/451 |
| 2005/0062975 A1 * | 3/2005 | Morris | ........................ | 356/451 |

FOREIGN PATENT DOCUMENTS

| | | |
|---|---|---|
| JP | 8-029255 | 2/1996 |
| JP | 10-221020 | 8/1998 |

OTHER PUBLICATIONS

English Language Abstract of JP 8-029255. Feb. 2, 1996.
English Language Abstract of JP 10-221020. Aug. 21, 1998.

* cited by examiner

*Primary Examiner*—Tarifur R Chowdhury
*Assistant Examiner*—Jonathan M Hansen
(74) *Attorney, Agent, or Firm*—Greenblum & Bernstein, P.L.C.

(57) ABSTRACT

There is provided a wavelength determining device including a reference wavelength measuring section 42 that, based upon a number A of interference fringes generated by an optical path difference of first reference wavelength light (wavelength: $\lambda 1$) and a number C of interference fringes generated by the optical path difference of second reference wavelength light (wavelength: $\lambda 2$), measures the wavelength of the second reference wavelength light, an input light wavelength measuring section 44, based upon the number A of the interference fringes generated by the optical path difference of the first reference wavelength light (wavelength: $\lambda 1$) and a number B of interference fringes generated by the optical path difference of input light (wavelength: $\lambda x$), measures the wavelength of the input light, a correction coefficient determining section 46 that determines a second correction coefficient k based upon the measured wavelength $\lambda c$ of the second reference wavelength light and the measured wavelength $\lambda m$ of the input light, and an input light wavelength correcting section 48 that corrects the measured wavelength of the input light by multiplying the measured wavelength $\lambda m$ of the input light by the second correction coefficient k, in order to correctly measure the wavelength $\lambda x (= k \cdot \lambda m)$ of the input light.

13 Claims, 8 Drawing Sheets

WAVELENGTH DETERMINING DEVICE, WAVELENGTH METER EQUIPPED WITH THE DEVICE, WAVELENGTH DETERMINING METHOD, PROGRAM, AND RECORDING MEDIUM

BACKGROUND OF THE INVENTION

1. Field of the Invention

The present invention relates to a measurement of a wavelength of light by means of an interferometer.

2. Description of the Prior Art

Conventionally, a measurement of a wavelength of light and the like has been practiced by means of an interferometer (Michelson interferometer, for example) (refer to Japanese Laid-Open Patent Publication (Kokai) No. H8-29255, for example). A principle of the measurement of the wavelength of light is described below.

First, a Michelson interferometer is configured to generate a predetermined optical path difference L. On this occasion, reference light (wavelength: $\lambda 1$, known) is supplied to the Michelson interferometer. It is assumed that the number of resulting interference fringes is A. In addition, light with a wavelength to be measured (wavelength: $\lambda x$, unknown) is supplied to the Michelson interferometer. It is assumed that the number of resulting interference fringes is B. Then, the wavelength $\lambda x=(A/B)\lambda 1$.

However, if the Michelson interferometer is used in the air, due to the wavelength dispersion of the refractive index of the air, $\lambda x=(A/B)\lambda 1$ does not hold in a strict sense. It is thus necessary to multiply a correction coefficient K in order to correct the influence of the refractive index of the air. Namely, $\lambda x=(A/B)K\lambda 1$. It should be noted that the correction coefficient K is obtained by the Edlen equation (refer to Japanese Laid-Open Patent Publication (Kokai) No. H10-221020, for example). In addition, although the refractive index of the air changes according to the wavelength, the refractive index also change according to the temperature, pressure, humidity, $CO_2$ concentration, and the like of the air. Thus, it is necessary to correctly measure the temperature, pressure, humidity, $CO_2$ concentration, and the like of the air to correctly obtain the correction coefficient K.

However, it is difficult to correctly measure the temperature, pressure, humidity, $CO_2$ concentration, and the like of the air. Moreover, as the wavelength $\lambda x$ of the light to be measured departs from the wavelength $\lambda 1$ of the reference light, the error cannot be sufficiently corrected even using the correction coefficient K, and becomes larger.

Further, the correction coefficient K can only correct the influence by the refractive index of the air. The correction cannot be carried out if an alignment (positioning) of optical elements in the Michelson interferometer deviates, and an error consequently occurs in the measurement of the wavelength.

SUMMARY OF THE INVENTION

In view of the foregoing problems, an object of the present invention is to correctly measure the wavelength of light.

According to an aspect of the present invention, a wavelength determining apparatus includes: a reference wavelength measuring unit that measures a wavelength of second reference wavelength light based upon a number of interference fringes generated by an optical path difference of first reference wavelength light, and a number of interference fringes generated by the optical path difference of the second reference wavelength light; an input light wavelength measuring unit that measures a wavelength of input light based upon the number of interference fringes generated by the optical path difference of the first reference wavelength light, and a number of interference fringes generated by the optical path difference of the input light; a correction coefficient determining unit that determines a correction coefficient based upon the measured wavelength of the second reference wavelength light and the measured wavelength of the input light; and an input light wavelength correcting unit that corrects the measured wavelength of the input light by multiplying the measured wavelength of the input light by the correction coefficient.

According to the thus constructed wavelength determining apparatus, a reference wavelength measuring unit measures a wavelength of second reference wavelength light based upon a number of interference fringes generated by an optical path difference of first reference wavelength light, and a number of interference fringes generated by the optical path difference of the second reference wavelength light. An input light wavelength measuring unit measures a wavelength of input light based upon the number of interference fringes generated by the optical path difference of the first reference wavelength light, and a number of interference fringes generated by the optical path difference of the input light. A correction coefficient determining unit determines a correction coefficient based upon the measured wavelength of the second reference wavelength light and the measured wavelength of the input light. An input light wavelength correcting unit corrects the measured wavelength of the input light by multiplying the measured wavelength of the input light by the correction coefficient.

According to the wavelength determining apparatus of the present invention, the correction coefficient may be 1 when the wavelength of the input light is equal to the wavelength of the first reference wavelength light.

According to the present invention, a wavelength meter may include: the wavelength determining apparatus according to the present invention; a first reference wavelength light source that emits the first reference wavelength light; a second reference wavelength light source that emits the second reference wavelength light; a coupler that couples the second reference wavelength light and the input light to each other; an optical path difference generating unit that generates the optical path difference in the first reference wavelength light and an output from the coupler; and a demultiplexer that demultiplexes a signal based upon an output corresponding to the output from the coupler of outputs from the optical path difference generating unit into a signal based upon the second reference wavelength light and a signal based upon light with a wavelength other than the wavelength of the second reference wavelength light.

According to the present invention, a wavelength meter may include: the wavelength determining apparatus according to the present invention; a first reference wavelength light source that emits the first reference wavelength light; a second reference wavelength light source that emits the second reference wavelength light; an optical switch that outputs either the second reference wavelength light or the input light; and an optical path difference generating unit that generates the optical path difference in the first reference wavelength light and the output from the optical switch.

According to the present invention, a wavelength meter may include: the wavelength determining apparatus according to the present invention; a first reference wavelength light source that emits the first reference wavelength light; a second reference wavelength light source that emits the second reference wavelength light; a coupler that couples the first reference wavelength light and the second reference wavelength light to each other; an optical path difference generating unit that generates the optical path difference in the input light and an output from the coupler; and a demultiplexer that demultiplexes a signal based upon an output corresponding to the output from the coupler of outputs from the optical path difference generating unit into a signal based upon the first reference wavelength light and a signal based upon the second reference wavelength light.

According to the present invention, a wavelength meter may include: the wavelength determining apparatus according to the present invention; a first reference wavelength light source that emits the first reference wavelength light; a second reference wavelength light source that emits the second reference wavelength light; a coupler that couples the second reference wavelength light and the input light to each other; an optical path difference generating unit that generates the optical path difference in the first reference wavelength light and an output from the coupler; and a demultiplexer that demultiplexes an output corresponding to the output from the coupler of outputs from the optical path difference generating unit into the second reference wavelength light and light with a wavelength other than the wavelength of the second reference wavelength light.

According to the present invention, a wavelength meter may include: the wavelength determining apparatus according to the present invention; a first reference wavelength light source that emits the first reference wavelength light; a second reference wavelength light source that emits the second reference wavelength light; a coupler that couples the first reference wavelength light and the second reference wavelength light to each other; an optical path difference generating unit that generates the optical path difference in the input light and an output from the coupler; and a demultiplexer that demultiplexes an output corresponding to the output from the coupler of outputs from the optical path difference generating unit into the first reference wavelength light and the second reference wavelength light.

According to the wavelength meter of the present invention, the wavelength of the second reference wavelength light may be determined based upon the wavelength of the first reference wavelength light.

According to the wavelength meter of the present invention, the second reference wavelength light source may be an optical frequency multiplier that receives the first reference wavelength light.

According to the present invention, the wavelength meter may further includes: a reference wavelength cell which receives the light emitted from the second reference wavelength light source, and absorbs light with a predetermined wavelength; and a control unit that controls the wavelength of the light emitted from the first reference wavelength light source according to a difference between the wavelength of the light emitted from the second reference wavelength light source and the predetermined wavelength.

According to another aspect of the present invention, a wavelength determining method may includes: a reference wavelength measuring step of measuring a wavelength of second reference wavelength light based upon a number of interference fringes generated by an optical path difference of first reference wavelength light, and a number of interference fringes generated by the optical path difference of the second reference wavelength light; an input light wavelength measuring step of measuring a wavelength of input light based upon the number of interference fringes generated by the optical path difference of the first reference wavelength light, and a number of interference fringes generated by the optical path difference of the input light; a correction coefficient determining step of determining a correction coefficient based upon the measured wavelength of the second reference wavelength light and the measured wavelength of the input light; and an input light wavelength correcting step of correcting the measured wavelength of the input light by multiplying the measured wavelength of the input light by the correction coefficient.

Another aspect of the present invention is a program of instructions for execution by the computer to perform a wavelength determining process. The wavelength determining process includes: a reference wavelength measuring step of measuring a wavelength of second reference wavelength light based upon a number of interference fringes generated by an optical path difference of first reference wavelength light, and a number of interference fringes generated by the optical path difference of the second reference wavelength light; an input light wavelength measuring step of measuring a wavelength of input light based upon the number of interference fringes generated by the optical path difference of the first reference wavelength light, and a number of interference fringes generated by the optical path difference of the input light; a correction coefficient determining step of determining a correction coefficient based upon the measured wavelength of the second reference wavelength light and the measured wavelength of the input light; and an input light wavelength correcting step of correcting the measured wavelength of the input light by multiplying the measured wavelength of the input light by the correction coefficient.

Another aspect of the present invention is a computer-readable medium having a program of instructions for execution by the computer to perform a wavelength determining process. The wavelength determining process includes: a reference wavelength measuring step of measuring a wavelength of second reference wavelength light based upon a number of interference fringes generated by an optical path difference of first reference wavelength light, and a number of interference fringes generated by the optical path difference of the second reference wavelength light; an input light wavelength measuring step of measuring a wavelength of input light based upon the number of interference fringes generated by the optical path difference of the first reference wavelength light, and a number of interference fringes generated by the optical path difference of the input light; a correction coefficient determining step of determining a correction coefficient based upon the measured wavelength of the second reference wavelength light and the measured wavelength of the input light; and an input light wavelength correcting step of correcting the measured wavelength of the input light by multiplying the measured wavelength of the input light by the correction coefficient.

DETAILED DESCRIPTION OF THE PREFERRED EMBODIMENTS

A description will now be given of an embodiment of the present invention with reference to drawings.

First Embodiment

Figure 1:
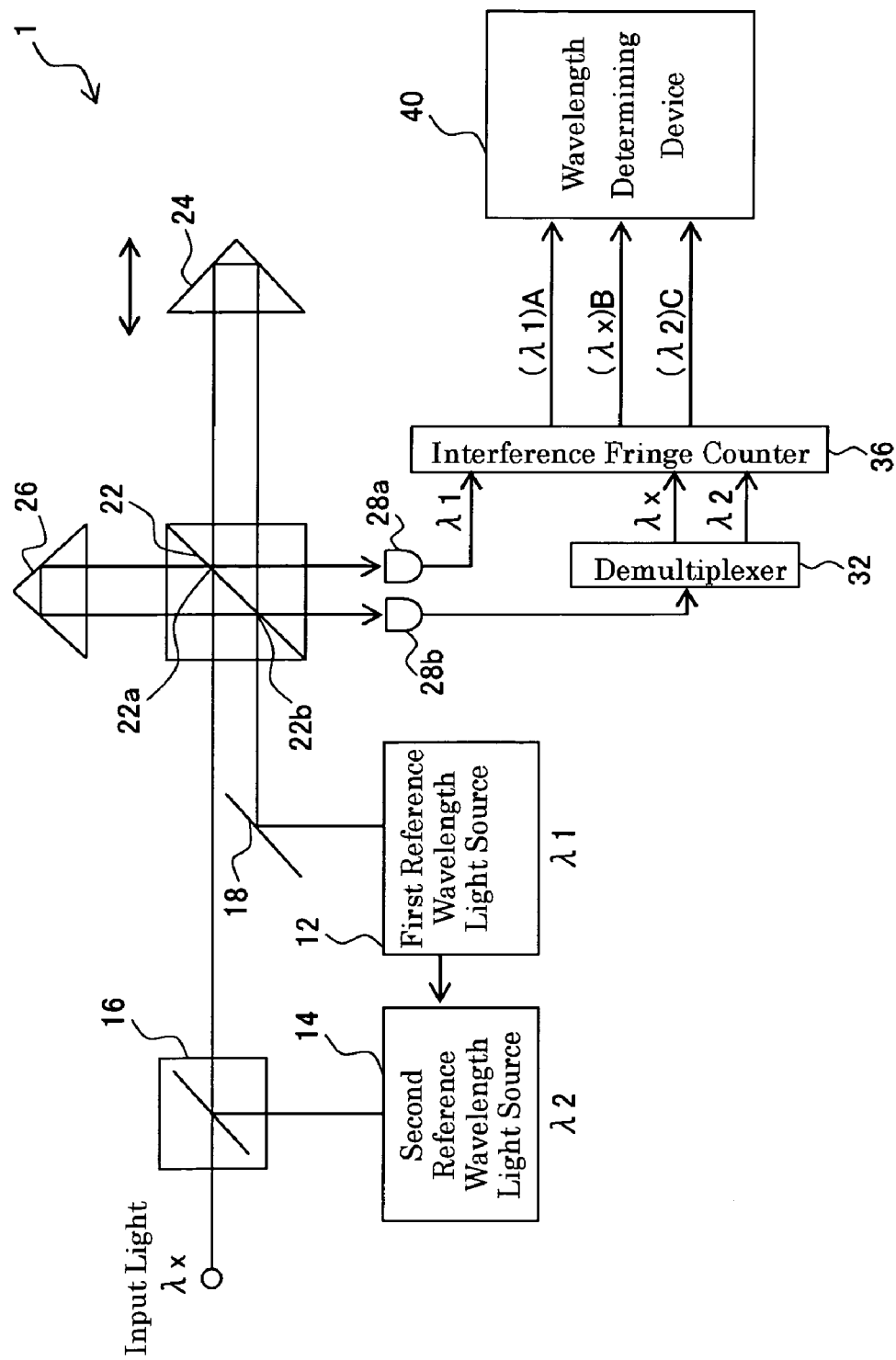
FIG. 1 is a diagram showing a configuration of a wavelength meter 1 according a first embodiment of the present invention.

FIG. 1 is a diagram showing a configuration of a wavelength meter 1 according a first embodiment of the present invention. The wavelength meter 1 according to the first embodiment is provided with a first reference wavelength light source 12, a second reference wavelength light source 14, a coupler 16, an incident mirror 18, a half mirror 22, a movable reflecting mirror 24, a fixed reflecting mirror 26, photo diodes 28*a*, 28*b*, a demultiplexer 32, an interference fringe counter 36, and a wavelength determining device 40. The wavelength meter 1 is used to measure a wavelength $\lambda x$ of input light.

The first reference wavelength light source 12 emits first reference wavelength light (wavelength: $\lambda 1$). It should be noted that $\lambda 1$ is referred to as first reference wavelength.

The second reference wavelength light source 14 emits second reference wavelength light (wavelength: $\lambda 2$). It should be noted that $\lambda 2$ is referred to as second reference wavelength. The second reference wavelength $\lambda 2$ is preferably determined based upon the first reference wavelength $\lambda 1$. The second reference wavelength light source 14 may be an optical frequency multiplier such as an SHG (Second Harmonic Generator), and may receive the first reference wavelength light from the first reference wavelength source 12. In this case, the second reference wavelength $\lambda 2$ is represented as $(\frac{1}{2}) \times \lambda 1$.

Figure 2:
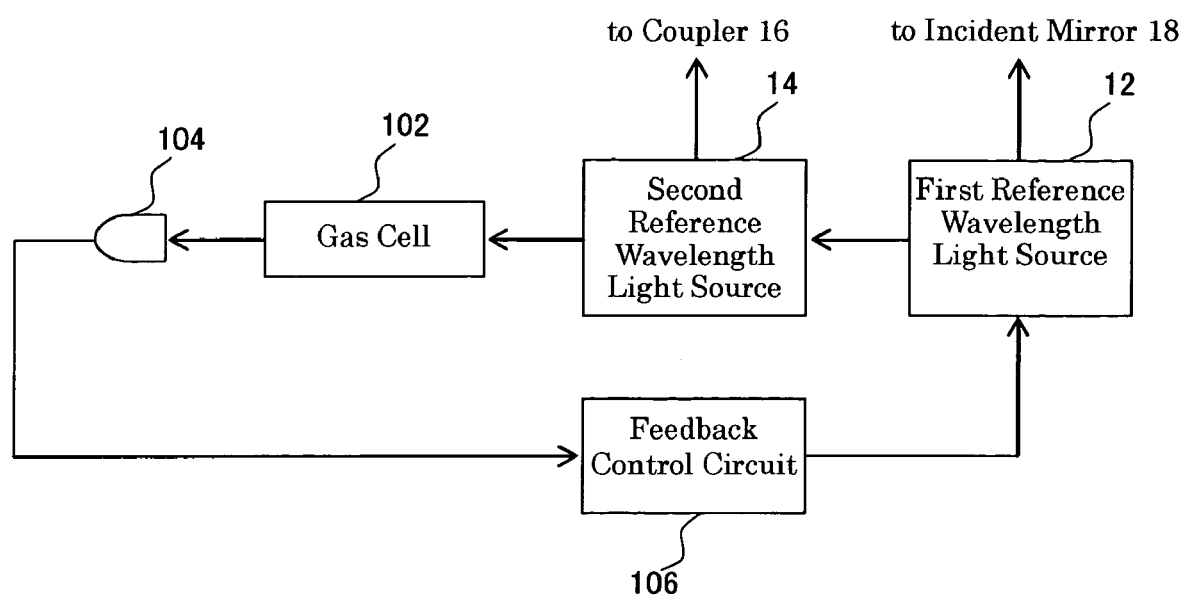
FIG. 2 is a diagram showing a variation of a configuration of a portion corresponding to the first reference wavelength light source 12 and the second reference wavelength light source 14.

It should be noted that FIG. 2 shows a variation of a configuration of a portion corresponding to the first reference wavelength light source 12 and the second reference wavelength light source 14. The variation shown in FIG. 2 carries out feedback control in order to stabilize the first reference wavelength $\lambda 1$ and the second reference wavelength $\lambda 2$.

In the variation shown in FIG. 2, to the wavelength meter 1 is added a gas cell 102, a photo diode 104, and a feedback control circuit 106. It is assumed that the first reference wavelength $\lambda 1$ is within a 1.5 μm band, and the second reference wavelength $\lambda 2$ is within a 0.75 μm band. On this occasion, although the wavelength of the light emitted by the first reference wavelength light source 12 is ideally the first reference wavelength $\lambda 1$, an error may be generated. Similarly, although the wavelength of the light emitted by the second reference wavelength light source 14 is ideally the second reference wavelength $\lambda 2$, an error $\Delta \lambda$ may be generated. Namely, the wavelength of the light emitted by the second reference wavelength light source 14 may be $\lambda 2 + \Delta \lambda$.

The gas cell 102 is filled with Rb (rubidium), for example. The gas cell 102 receives the second reference wavelength light emitted by the second reference wavelength light source 14, and absorbs light with a wavelength close to the second reference wavelength $\lambda 2$, and supplies the photo diode 104 with resulting light.

The photo diode 104 converts the light supplied from the gas cell 102 into an electric signal. This electric signal corresponds to the wavelength $\lambda 2 + \Delta \lambda$ of the light supplied to the photo diode 104.

The feedback control circuit 106 receives the electric signal from the photo diode 104. If the wavelength $\lambda 2 + \Delta \lambda$ indicated by the received electric signal is lower than the second reference wavelength $\lambda 2$ ($\Delta \lambda < 0$), the first reference wavelength light source 12 is controlled to increase the wavelength of the light emitted by the first reference wavelength light source 12. If the wavelength $\lambda 2 + \Delta \lambda$ indicated by the received electric signal is higher than the second reference wavelength $\lambda 2$ ($\Delta \lambda > 0$), the first reference wavelength light source 12 is controlled to decrease the wavelength of the light emitted by the first reference wavelength light source 12.

In this way, the wavelength of the light emitted from the first reference wavelength light source 12 is adjusted according to the error $\Delta \lambda$ of the wavelength of the light emitted by the second reference wavelength light source 14 with respect to the second reference wavelength $\lambda 2$ (absorption wavelength of the gas cell 102).

It should be noted that if the wavelength of the first reference wavelength light and the wavelength of the second reference wavelength light are controlled by means of a known optical PLL (Phase Locked Loop), the second reference wavelength $\lambda 2$ is also determined based upon the first reference wavelength $\lambda 1$.

The coupler 16 supplies the half mirror 22 with coupled light obtained by coupling the second reference wavelength light and the input light to each other.

The incident mirror 18 receives the first reference wavelength light from the first reference wavelength light source 12, and supplies the half mirror 22 with the first reference wavelength light.

It should be noted that the coupled light and the first reference wavelength light progress in parallel.

The half mirror 22 reflects a half of incident light, and transmits the rest half of the light. The half mirror 22 receives the coupled light supplied from the coupler 16 at a first reflecting point 22*a*. Moreover, the half mirror 22 receives the first reference wavelength light at a second reflecting point 22*b*. The half mirror 22 is tilted by 45 degrees with respect to an incident direction of the coupled light and the first reference wavelength light.

The movable reflecting mirror 24 is configured to reflect the light which has transmitted the first reflecting point 22*a* of the half mirror 22, and to supply the second reflecting point 22*b* with the reflected light, is configured to reflect the light which has transmitted the second reflecting point 22*b* of the half mirror 22, and to supply the first reflecting point 22*a* with the reflected light. It should be noted that the movable reflecting mirror 24 is movable in parallel with the incident direction of the coupled light and the first reference wavelength light.

The fixed reflecting mirror 26 is configured to reflect the light reflected by the first reflecting point 22*a* of the half mirror 22, and to supply the second reflecting point 22*b* with the reflected light, and is configured to reflect the light reflected by the second reflecting point 22*b* of the half mirror 22, and to supply the first reflecting point 22*a* with the reflected light. It should be noted that the fixed reflecting mirror 26 is fixed.

It should be noted that an optical path difference L is generated in the first reference wavelength light and the coupled light output by the coupler 16 due to the half mirror 22, the movable reflecting mirror 24, and the fixed reflecting mirror 26. Namely, the half mirror 22, the movable reflecting mirror 24, and the fixed reflecting mirror 26 function as an optical path difference generator.

Namely, there is the optical path difference L between a length of an optical path along which the first reference wavelength light transmits the second reflecting point 22b of the half mirror 22, is reflected by the movable reflecting mirror 24, and reaches the first reflecting point 22a of the half mirror 22, and a length of an optical path along which the first reference wavelength light reflected by the second reflecting point 22b of the half mirror 22, is reflected by the fixed reflecting mirror 26, and reaches the first reflecting point 22a of the half mirror 22.

Moreover, there is also the optical path difference L between a length of an optical path along which the coupled light transmits the first reflecting point 22a of the half mirror 22, is reflected by the movable reflecting mirror 24, and reaches the second reflecting point 22b of the half mirror 22, and a length of an optical path along which the coupled light reflected by the first reflecting point 22a of the half mirror 22, is reflected by the fixed reflecting mirror 26, and reaches the second reflecting point 22b of the half mirror 22.

It should be noted that, as a mechanism that generates the optical path difference L for the first reference wavelength light and the coupled light output by the coupler 16, in the example shown in FIG. 1 is used a Michelson interferometer (including the half mirror 22, the movable reflecting mirror 24, and the fixed reflecting mirror 26). However the mechanism which generates the optical path difference L is not limited to the Michelson interferometer, and may be a Fizeau interferometer, for example.

The photo diode 28a receives interference fringes generated at the first reflecting point 22a of the half mirror 22, and converts the interference fringes into an electric signal. The electric signal output by the photo diode 28a is a signal based upon the first reference wavelength light (signal based upon the light with the wavelength $\lambda 1$). The photo diode 28b receives interference fringes generated at the second reflecting point 22b of the half mirror 22, and converts the interference fringes into an electric signal. The electric signal output by the photo diode 28b is a mixed signal of a signal based upon the second reference wavelength light (signal based upon the light with the wavelength $\lambda 2$) and a signal based upon light with a wavelength other than the wavelength $\lambda 2$ (signal based upon the light with the wavelength $\lambda x$).

The demultiplexer 32 demultiplexes the electric signal output by the photo diode 28b into the signal based upon the second reference wavelength light (signal based upon the light with the wavelength $\lambda 2$) and the signal based upon the light with the wavelength other than the wavelength $\lambda 2$ (signal based upon the light with the wavelength $\lambda x$). The demultiplexer 32 is an electric wave filter, for example. It should be noted that the demultiplexer 32 may be an optical demultiplexer, and the demultiplexer 32 may receive the interference fringes generated at the second reflecting point 22b to demultiplex them into the second reference wavelength light and the light with the wavelength other than the wavelength $\lambda 2$. The demultiplexed light may be converted into electric signals by photo diodes, and the electric signals are input to the interference fringe counter 36.

The interference fringe counter 36 receives the electric signals from the photo diode 28a and the demultiplexer 32 to count the numbers of the interference fringes. A number A of the interference fringes generated by the optical path difference L of the first reference wavelength light is counted based upon the electric signal received from the photo diode 28a. A number B of the interference fringes generated by the optical path difference L of the input light, and a number C of the interference fringes generated by the optical path difference L of the second reference wavelength light are counted based upon the electric signals received from the demultiplexer 32.

Figure 3:
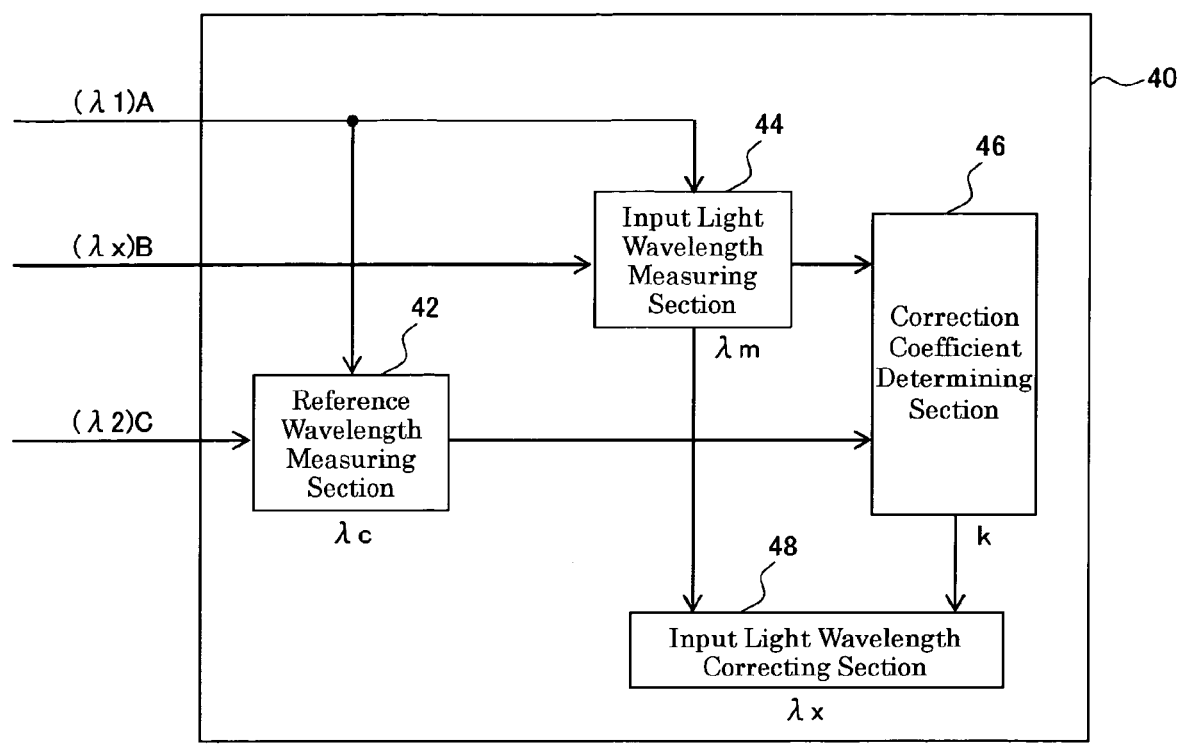
FIG. 3 is a functional block diagram showing a configuration of the wavelength determining device 40.

FIG. 3 is a functional block diagram showing a configuration of the wavelength determining device 40. The wavelength determining device 40 is provided with a reference wavelength measuring section 42, an input light wavelength measuring section 44, a correction coefficient determining section 46, and an input light wavelength correcting section 48. The wavelength determining device 40 is used to correctly determine the wavelength $\lambda x$ of the input light.

The reference wavelength measuring section 42 measures the wavelength of the second reference wavelength light based upon the number A of the interference fringes generated by the optical path difference L of the first reference wavelength light, and the number C of the interference fringes generated by the optical path difference L of the second reference wavelength light. A measured result $\lambda c$ is represented as:

$$\lambda c = (A/C) K \lambda 1 \qquad (1)$$

where a first correction coefficient K is used to correct an influence by of the refractive index of the air in which the wavelength meter 1 is used. The first correction coefficient K can be obtained according to the Edlen equation. $\lambda c$ is ideally equal to the wavelength $\lambda 2$ of the second reference wavelength light. If the first reference wavelength $\lambda 1$ and the wavelength of the input light are equal, since the refractive index is the same for both the first reference wavelength light and the input light, and the first correction coefficient K is exactly 1. However, if the wavelength of the input light deviates from $\lambda 1$, it is not possible to correctly obtain the first correction coefficient K due to the influence of the wavelength dispersion of the refractive index and the like. As a result, $\lambda c \neq \lambda 2$.

The input light wavelength measuring section 44 measures the wavelength of the input light based upon the number A of the interference fringes generated by the optical path difference L of the first reference wavelength light, and the number B of the interference fringes generated by the optical path difference L of the input light. A measured result $\lambda m$ is represented as:

$$\lambda m = (A/B) K \lambda 1 \qquad (2)$$

$\lambda m$ is ideally equal to the wavelength $\lambda x$ of the input light. However, although the first correcting coefficient K can be correctly measured if the wavelength $\lambda 1$ of the first reference wavelength light is measured, the first correcting coefficient K cannot be measured correctly if a wavelength to be measured deviates from $\lambda 1$. As a result, $\lambda m \neq \lambda x$.

The correction coefficient determining section 46 determines a second correcting coefficient k based upon the wavelength $\lambda c$ of the second reference wavelength light measured by the reference wavelength measuring section 42, and the wavelength $\lambda m$ of the input light measured by the input light wavelength measuring section 44. The second correcting coefficient k satisfies the following equation.

$$\lambda x = (A/B) K k \lambda 1 \qquad (3)$$

On this occasion, the first correction coefficient K is obtained correctly in principle if the wavelength $\lambda 1$ of the first refer ence wave length light is measured. Namely, if the wavelength of the input light $\lambda x=\lambda 1$, the following equation holds.

$$\lambda 1=(A/B)K\lambda 1 \quad (4)$$

According to the equation (3) and the equation (4), if the wavelength $\lambda x$ of the input light is $\lambda 1$, the second correction coefficient k is 1.

Moreover, when the wavelength $\lambda 2$ of the second reference wavelength light is measured based upon the number C of the interference fringes generated by the optical path difference L of the second reference wavelength light, $\lambda x$ in the equation (3) is replaced by $\lambda 2$, B in the equation (3) is replaced by C, and there is obtained:

$$\lambda 2=(A/C)Kk\lambda 1 \quad (5)$$

According to the equation (5) and the equation (1), if the wavelength $\lambda 2$ of the second reference wavelength light is measured, it is understood that the second correction coefficient k is $\lambda 2/\lambda c$.

Moreover, the error of the first correction coefficient K due to a deviation of the wavelength to be measured from $\lambda 1$ is caused by a correction error after the correction according to the refractive index of the standard air (15° C., 760 mmHg) as well as a measurement error due to influence of the wavelength dispersion of the glass refractive index caused by an optical path difference generated in glass parts such as the mirrors in addition to the optical path difference of the air sections due to errors of alignment (positioning) of the optical elements of the wavelength meter 1, and is not thus fully corrected by the Edlen equation. These errors are approximately proportional to a difference between the first reference wavelength $\lambda 1$ and the wavelength to be measured.

Figure 4:
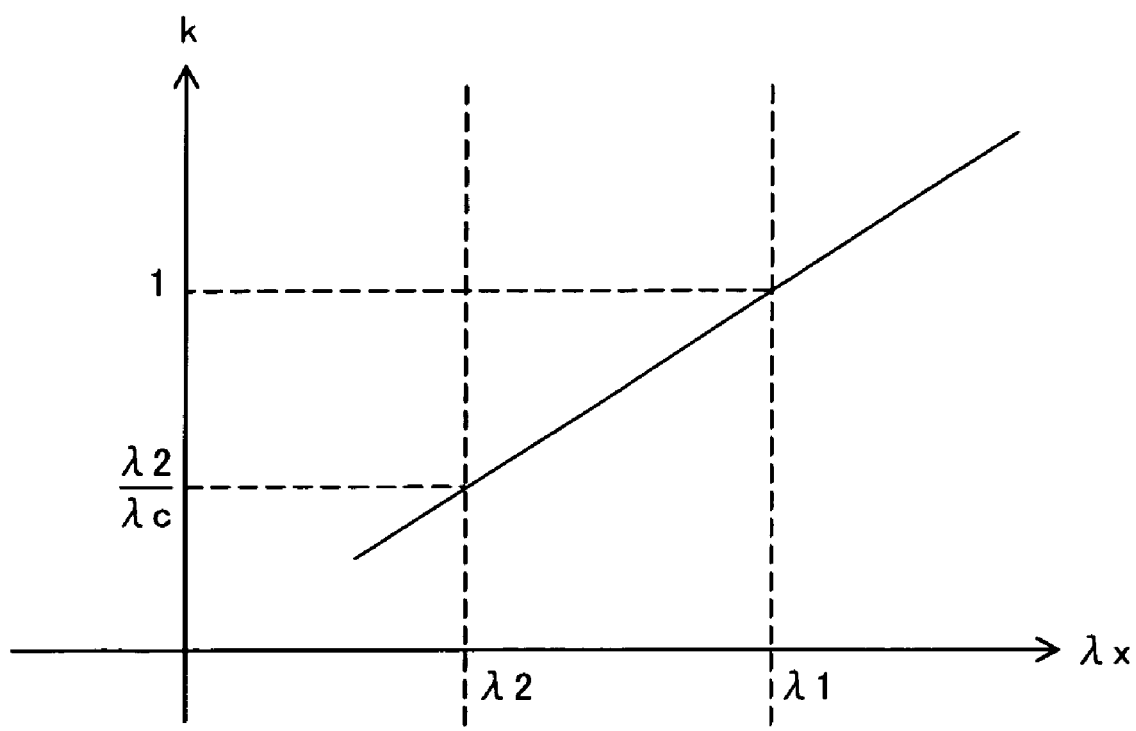
FIG. 4 is a chart showing a relationship between the second correction coefficient k and the wavelength $\lambda X$ to be measured.

FIG. 4 is a chart showing a relationship between the second correction coefficient k and the wavelength $\lambda X$ to be measured. Since the correction error and the measurement error are approximately proportional to the difference between the first reference wavelength $\lambda 1$ and the wavelength to be measured, a relationship between the second correction coefficient k and the wavelength $\lambda x$ to be measured is represented by a linear function (a chart of a straight line). According to FIG. 4, the relationship between the second correction coefficient k and the wavelength $\lambda x$ to be measured is represented as:

$$k=P\lambda x+(1-P\lambda 1) \quad (6)$$

It should be noted that $P=((\lambda 2/\lambda c)-1)/(\lambda 2-\lambda 1)$. According to FIG. 4, the gradient is apparently P, and if $\lambda 1$ is assigned to $\lambda x$, k=1, and the equation (6) is thus apparently correct. From the equations (2) and (3) is obtained:

$$\lambda x=k\cdot\lambda m \quad (7)$$

If the equation (7) is assigned to the equation (6), the following equation (8) is obtained. An equation (9) is obtained by transforming the equation (8).

$$k=P\lambda m\cdot k+(1-P\lambda 1) \quad (8)$$

$$(1-P\lambda m)k=1-P\lambda 1 \quad (9)$$

If the equation (9) is solved with respect to k, there is obtained:

$$k=(1-P\lambda 1)/(1-P\lambda m) \quad (10)$$

The first reference wavelength $\lambda 1$ and the second reference wavelength $\lambda 2$ are known. The second correcting coefficient k is thus obtained by assigning the wavelength $\lambda c$ of the second reference wavelength light measured by the reference wavelength measuring section 42, and the wavelength $\lambda m$ of the input light measured by the input light wavelength measuring section 44 to the equation (10).

The input light wavelength correcting section 48 receives the second correction coefficient k from the correction coefficient determining section 46, receives the measured wavelength $\lambda m$ of the input light from the input light wavelength measuring section 44, and obtains the wavelength $\lambda x$ of the input light according to $\lambda x=k\cdot\lambda m$. This implies obtaining the wavelength $\lambda x$ of the input light by multiplying the measured wavelength $\lambda m$ of the measured input light by the second correction coefficient k to correct the measured wavelength $\lambda m$ of the input light.

For example, it is assumed that the measured wavelength of the input light is $\lambda c$. Thus, the wavelength of the input light is $\lambda 2$. If $\lambda m=\lambda c$ is assigned to the equation (10), the second correction coefficient k is represented as $\lambda 2/\lambda c$. Then, the wavelength $\lambda x$ of the input light is represented as $k\cdot\lambda m=(\lambda 2/\lambda c)\cdot\lambda c=\lambda 2$, which shows that the wavelength of the input light is correctly determined.

Moreover, it is assumed that the measured wavelength of the input light is $\lambda 1$. Thus, the wavelength of the input light is $\lambda 1$. If $\lambda m=\lambda 1$ is assigned to the equation (10), the second correction coefficient k is represented as 1. Then, the wavelength $\lambda x$ of the input light is represented as $k\cdot\lambda m=1\cdot\lambda 1=\lambda 1$, which shows that the wavelength of the input light is correctly determined.

A description will now be given of an operation of the first embodiment of the present invention.

The first reference wavelength light source 12 emits the first reference wavelength light (wavelength: $\lambda 1$). The first reference wavelength light is reflected by the incident mirror 18, and is made incident on the second reflecting point 22b of the half mirror 22.

Moreover, the first reference wavelength light is also supplied to the second reference wavelength light source 14, which is an SHG. The second reference wavelength light source 14 emits the second reference wavelength light (wavelength: $\lambda 2=\lambda 1;2$). The second reference wavelength light is coupled to the input light by the coupler 16. The coupled light is made incident on the first reflecting point 22a of the half mirror 22.

The half mirror 22 receives the coupled light supplied from the coupler 16 at the first reflecting point 22a. A half of the coupled light transmits the half mirror 22, and is supplied to the movable reflecting mirror 24. The rest half of the coupled light is reflected by the half mirror 22, and is supplied to the fixed reflecting mirror 26.

Moreover, the half mirror 22 receives the first reference wavelength light at the second reflecting point 22b. A half of the first reference wavelength light transmits the half mirror 22, and is supplied to the movable reflecting mirror 24. The rest half of the first reference wavelength light is reflected by the half mirror 22, and is supplied to the fixed reflecting mirror 26.

The movable reflecting mirror 24 reflects the coupled light which has transmitted the half mirror 22, and supplies the second reflecting point 22b of the half mirror 22 with the coupled light. Moreover, the movable reflecting mirror 24 reflects the first reference wavelength light which has transmitted the half mirror 22, and supplies the first reflecting point 22a of the half mirror 22 with the first reference wavelength light.

The fixed reflecting mirror 26 reflects the coupled light which has been reflected by the half mirror 22, and supplies the second reflecting point 22b of the half mirror 22 with the coupled light. Moreover, the fixed reflecting mirror 26 reflects the first reference wavelength light which has been reflected by the half mirror 22, and supplies the first reflecting point 22a of the half mirror 22 with the first reference wavelength light.

It should be noted that the optical path difference L is generated in the first reference wavelength light and the coupled light output from the coupler 16 by the half mirror 22, the movable reflecting mirror 24, and the fixed reflecting mirror 26.

As a result, the interference fringes of the first reference wavelength light are generated at the first reflecting point 22a. Moreover, the interference fringes of the coupled light are generated at the second reflecting point 22b.

The photo diode 28a receives the interference fringes of the first reference wavelength light generated at the first reflecting point 22a of the half mirror 22, and converts the interference fringes into the electric signal. The photo diode 28b receives the interference fringes of the coupled light generated at the second reflecting point 22b of the half mirror 22 (interference fringes corresponding to the output of the coupler 16 of the outputs of the optical path difference generator (half mirror 22, movable reflecting mirror 24, and fixed reflecting mirror 26)), and converts the interference fringes into the electric signal.

The electric signal output by the photo diode 28b is demultiplexed by the demultiplexer 32 into the signal based upon the second reference wavelength light (signal based upon the light with the wavelength $\lambda 2$) and the signal based upon the light with the wavelength other than the wavelength $\lambda 2$ (signal based upon the light with the wavelength $\lambda x$).

The interference fringe counter 36 receives the electric signals from the photo diode 28a and the demultiplexer 32 to count the numbers of the interference fringes. The number A of the interference fringes generated by the optical path difference L of the first reference wavelength light is counted based upon the electric signal received from the photo diode 28a. The number B of the interference fringes generated by the optical path difference L of the input light, and the number C of the interference fringes generated by the optical path difference L of the second reference wavelength light are counted based upon the electric signals received from the demultiplexer 32. The counted numbers of the interference fringes A, B, and C are supplied to the wavelength determining device 40.

Figure 5:
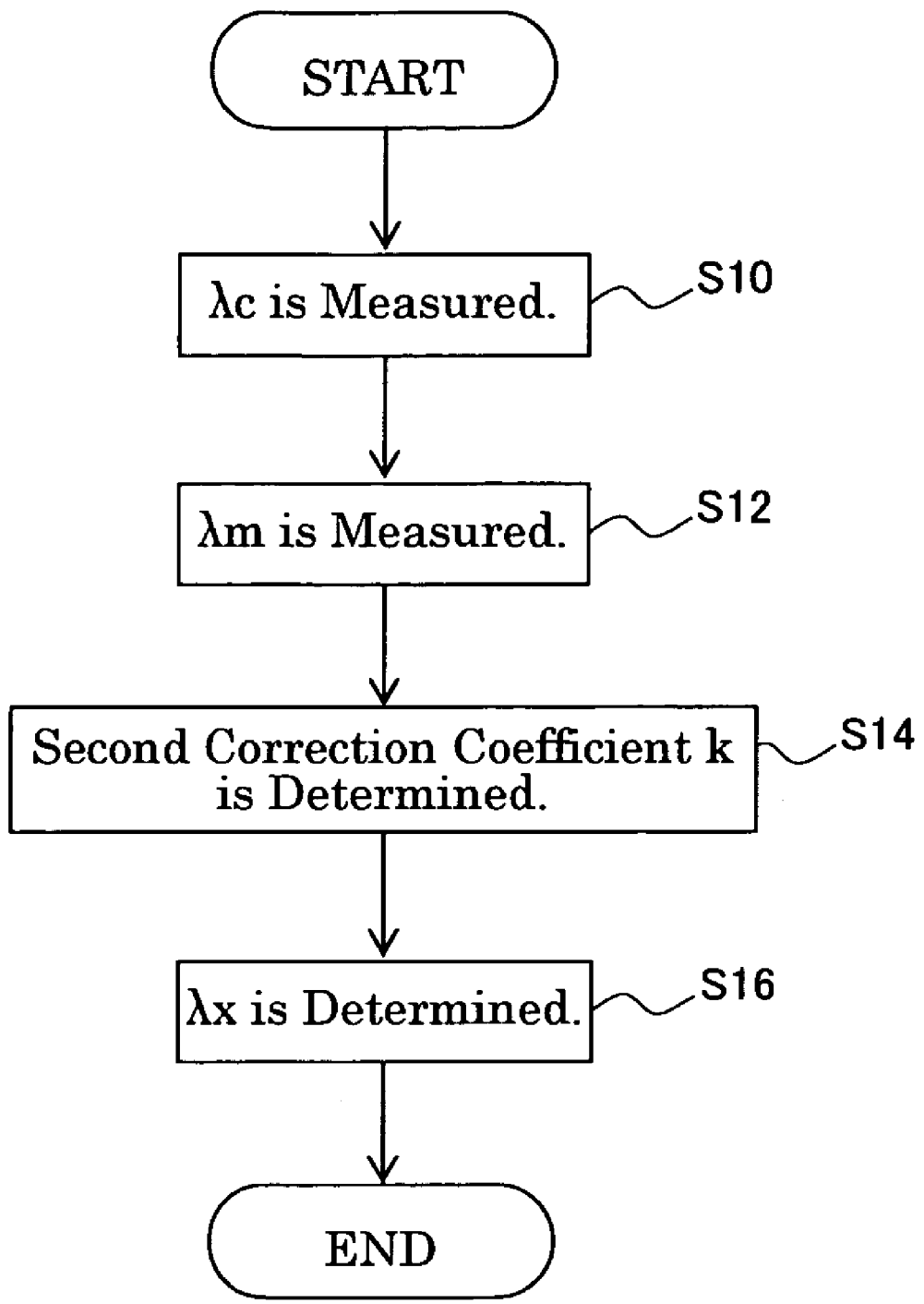
FIG. 5 is a flowchart showing an operation of the wavelength determining device 40.

FIG. 5 is a flowchart showing an operation of the wavelength determining device 40. First, the reference wavelength measuring section 42 measures the wavelength of the second reference wavelength light based upon the numbers A and C of the interference fringes (S10). The measured result $\lambda c$ is represented by the equation (1).

Then, the input light wavelength measuring section 44 measures the wavelength of the input light based upon the numbers A and B of the interference fringes (S12). The measured result $\lambda m$ is represented by the equation (2).

The correction coefficient determining section 46 receives $\lambda c$ from the reference wavelength measuring section 42, receives $\lambda m$ from the input light wavelength measuring section 44, and determines the second correction coefficient k (S14). The second correction coefficient k is represented by the equation (10). It should be noted that $P=((\lambda 2/\lambda c)-1)/(\lambda 2-\lambda 1)$.

Finally, the input light wavelength correcting section 48 multiplies $\lambda m$ by the second correction coefficient k to determine $\lambda x$ (S16).

According to the first embodiment of the present invention, even if an error is generated in the first correction coefficient K due to the deviation of the wavelength $\lambda x$ of the input light from the first reference wavelength $\lambda 1$, it is possible to correctly measure the wavelength $\lambda x$ of the input light by multiplying the measured result $\lambda m$ by the second correction coefficient k.

Second Embodiment

A wavelength meter according to a second embodiment is obtained by changing the configuration of the first embodiment where the second reference wavelength light and the input light are coupled by the coupler 16 to a configuration where the first reference wavelength light and the second reference wavelength light are coupled by a coupler 19.

Figure 6:
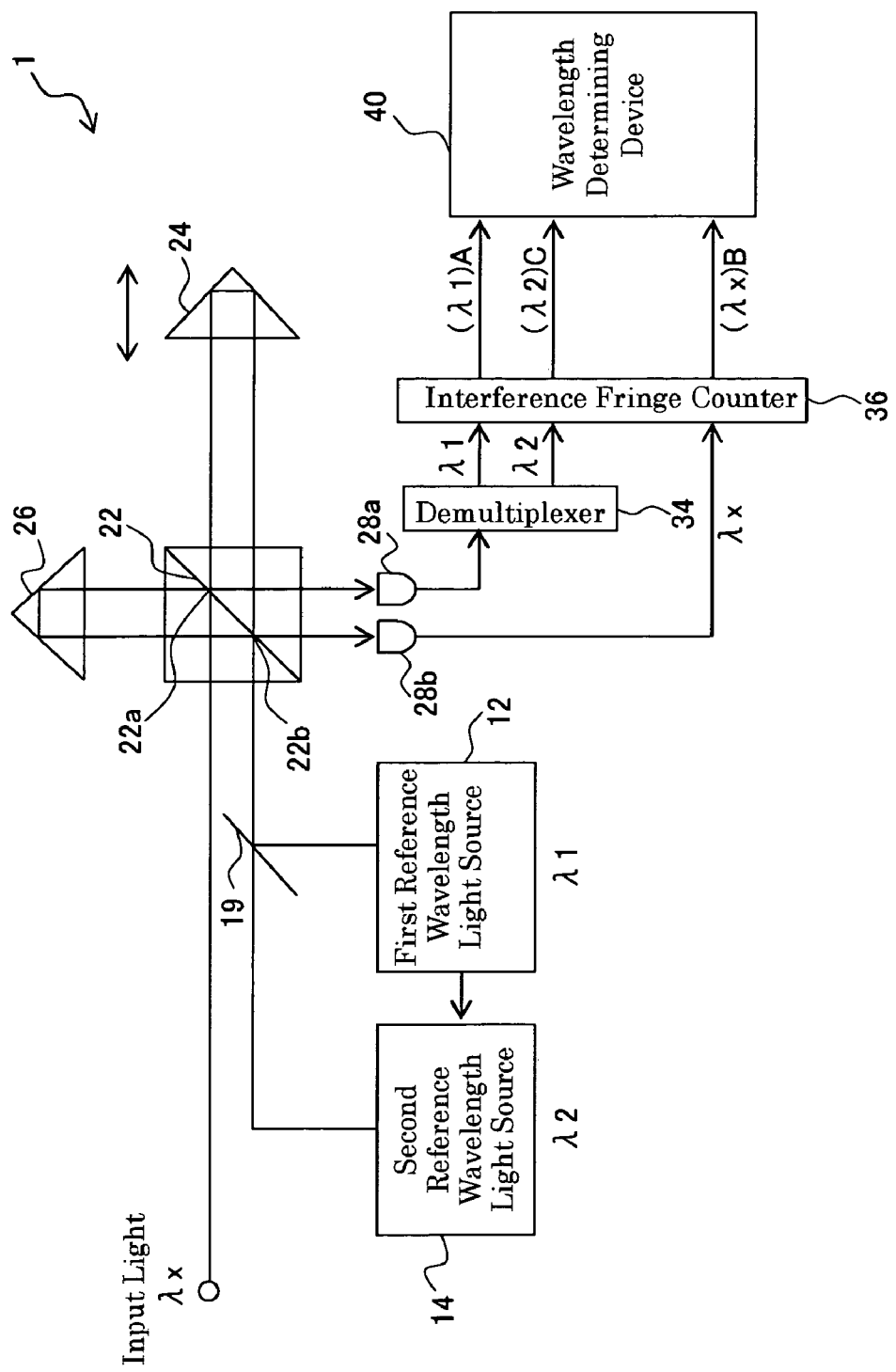
FIG. 6 is a diagram showing a configuration of the wavelength meter 1 according the second embodiment of the present invention.

FIG. 6 is a diagram showing a configuration of the wavelength meter 1 according the second embodiment of the present invention. The wavelength meter 1 according to the second embodiment is provided with a first reference wavelength light source 12, a second reference wavelength light source 14, the coupler 19, a half mirror 22, a movable reflecting mirror 24, a fixed reflecting mirror 26, photo diodes 28a, 28b, a demultiplexer 34, an interference fringe counter 36, and a wavelength determining device 40. In the following section, like components are denoted by like numerals as of the first embodiment, and will be explained in no more details.

The first reference wavelength light source 12 and the second reference wavelength light source 14 are similar to those in the first embodiment, and a description thereof, therefore, is omitted.

The coupler 19 supplies the half mirror 22 with the coupled light obtained by coupling the first reference wavelength light and the second reference wavelength light to each other. It should be noted that the input light and the coupled light progress in parallel.

The half mirror 22, the movable reflecting mirror 24, and the fixed reflecting mirror 26 are almost similar to those according to the first embodiment. It should be noted that the input light is received at a first reflecting point 22a, and the coupled light is received at a second reflecting point 22b.

The optical path difference L is generated in the input light and the coupled light output from the coupler 19 by the half mirror 22, the movable reflecting mirror 24, and the fixed reflecting mirror 26. Namely, the half mirror 22, the movable reflecting mirror 24, and the fixed reflecting mirror 26 function as an optical path difference generator. It should be noted that the mechanism which generates the optical path difference L is not limited to a Michelson interferometer, and may be a Fizeau interferometer, for example, which is the same as the first embodiment.

The photo diode 28a receives interference fringes generated at the first reflecting point 22a of the half mirror 22, and converts the interference fringes into an electric signal. The electric signal output by the photo diode 28a is a mixed signal of a signal based upon the first reference wavelength light (signal based upon the light with the wavelength $\lambda 1$) and a signal based upon the second reference wavelength light (signal based upon the light with the wavelength $\lambda 2$). The photo diode 28b receives interference fringes generated at the second reflecting point 22b of the half mirror 22, and converts the interference fringes into an electric signal. The electric signal output by the photo diode 28b is a signal based upon the input light (signal based upon the light with the wavelength $\lambda x$).

The demultiplexer 34 demultiplexes the electric signal output by the photo diode 28a into the signal based upon the second reference wavelength light (signal based upon the light with the wavelength $\lambda 2$) and the signal based upon the first reference wavelength light (signal based upon the light with the wavelength λ1). The demultiplexer 34 is an electric wave filter, for example. It should be noted that the demultiplexer 34 may be an optical demultiplexer, and the demultiplexer 34 may receive the interference fringes generated at the first reflecting point 22a to demultiplex them into the second reference wavelength light and the first reference wavelength light. The demultiplexed light may be converted into electric signals by photo diodes, and the electric signals are input to the interference fringe counter 36.

The interference fringe counter 36 receives the electric signals from the photo diode 28b and the demultiplexer 34 to count the numbers of the interference fringes. A number B of the interference fringes generated by the optical path difference L of the input light is counted based upon the electric signal received from the photo diode 28b. A number A of the interference fringes generated by the optical path difference L of the first reference wavelength light, and a number C of the interference fringes generated by the optical path difference L of the second reference wavelength light are counted based upon the electric signals received from the demultiplexer 32.

A configuration of the wavelength determining device 40 is similar to that in the first embodiment, and a description thereof, therefore, is omitted.

A description will now be given of an operation of the second embodiment of the present invention.

The first reference wavelength light source 12 emits the first reference wavelength light (wavelength: λ1). The first reference wavelength light is made incident on the coupler 19. Moreover, the first reference wavelength light is also supplied to the second reference wavelength light source 14, which is an SHG. The second reference wavelength light source 14 emits the second reference wavelength light (wavelength: λ2=λ1;2). The second reference wavelength light is made incident on the coupler 19. The coupler 19 couples the first reference wavelength light and the second reference wavelength light, and makes the coupled light incident on the second reflecting point 22b of the half mirror 22.

The input light is made incident on the first reflecting point 22a of the half mirror 22.

The half mirror 22 receives the input light at the first reflecting point 22a. A half of the input light transmits the half mirror 22, and is supplied to the movable reflecting mirror 24. The rest half of the input light is reflected by the half mirror 22, and is supplied to the fixed reflecting mirror 26.

Moreover, the half mirror 22 receives the coupled light from the coupler 19 at the second reflecting point 22b. A half of the coupled light transmits the half mirror 22, and is supplied to the movable reflecting mirror 24. The rest half of the coupled light is reflected by the half mirror 22, and is supplied to the fixed reflecting mirror 26.

The movable reflecting mirror 24 reflects the input light which has transmitted the half mirror 22, and supplies the second reflecting point 22b of the half mirror 22 with the input light. Moreover, the movable reflecting mirror 24 reflects the coupled light which has transmitted the half mirror 22, and supplies the first reflecting point 22a of the half mirror 22 with the coupled light.

The fixed reflecting mirror 26 reflects the input light which has been reflected by the half mirror 22, and supplies the second reflecting point 22b of the half mirror 22 with the input light. Moreover, the fixed reflecting mirror 26 reflects the coupled light which has been reflected by the half mirror 22, and supplies the first reflecting point 22a of the half mirror 22 with the coupled light.

It should be noted that the optical path difference L is generated in the first reference wavelength light and the coupled light output from the coupler 19 by the half mirror 22, the movable reflecting mirror 24, and the fixed reflecting mirror 26.

As a result, the interference fringes of the first coupled light are generated at the first reflecting point 22a. Moreover, the interference fringes of the input light are generated at the second reflecting point 22b.

The photo diode 28a receives the interference fringes of the coupled light generated at the first reflecting point 22a of the half mirror 22 (interference fringes corresponding to the output of the coupler 19 of the outputs of the optical path difference generator (half mirror 22, movable reflecting mirror 24, and fixed reflecting mirror 26)), and converts the interference fringes into the electric signal. The photo diode 28b receives interference fringes of the input light generated at the second reflecting point 22b of the half mirror 22, and converts the interference fringes into the electric signal.

The electric signal output by the photo diode 28a is demultiplexed by the demultiplexer 34 into the signal based upon the second reference wavelength light (signal based upon the light with the wavelength λ2) and the signal based upon the first reference wavelength light (signal based upon the light with the wavelength λ1).

The interference fringe counter 36 receives the electric signals from the photo diode 28b and the demultiplexer 34 to count the numbers of the interference fringes. The number B of the interference fringes generated by the optical path difference L of the input light is counted based upon the electric signal received from the photo diode 28b. The number A of the interference fringes generated by the optical path difference L of the first reference wavelength light, and the number C of the interference fringes generated by the optical path difference L of the second reference wavelength light are counted based upon the electric signals received from the demultiplexer 32. The counted numbers of the interference fringes A, B, and C are supplied to the wavelength determining device 40.

An operation of the wavelength determining device 40 is similar to that of the first embodiment (refer to FIG. 5).

According to the second embodiment, there are obtained effects similar to those of the first embodiment.

Third Embodiment

A wavelength meter according to a third embodiment is obtained by changing the configuration of the first embodiment where the second reference wavelength light and the input light are coupled by the coupler 16 to a configuration where the second reference wavelength light and the input light are switched by an optical switch 17.

Figure 7:
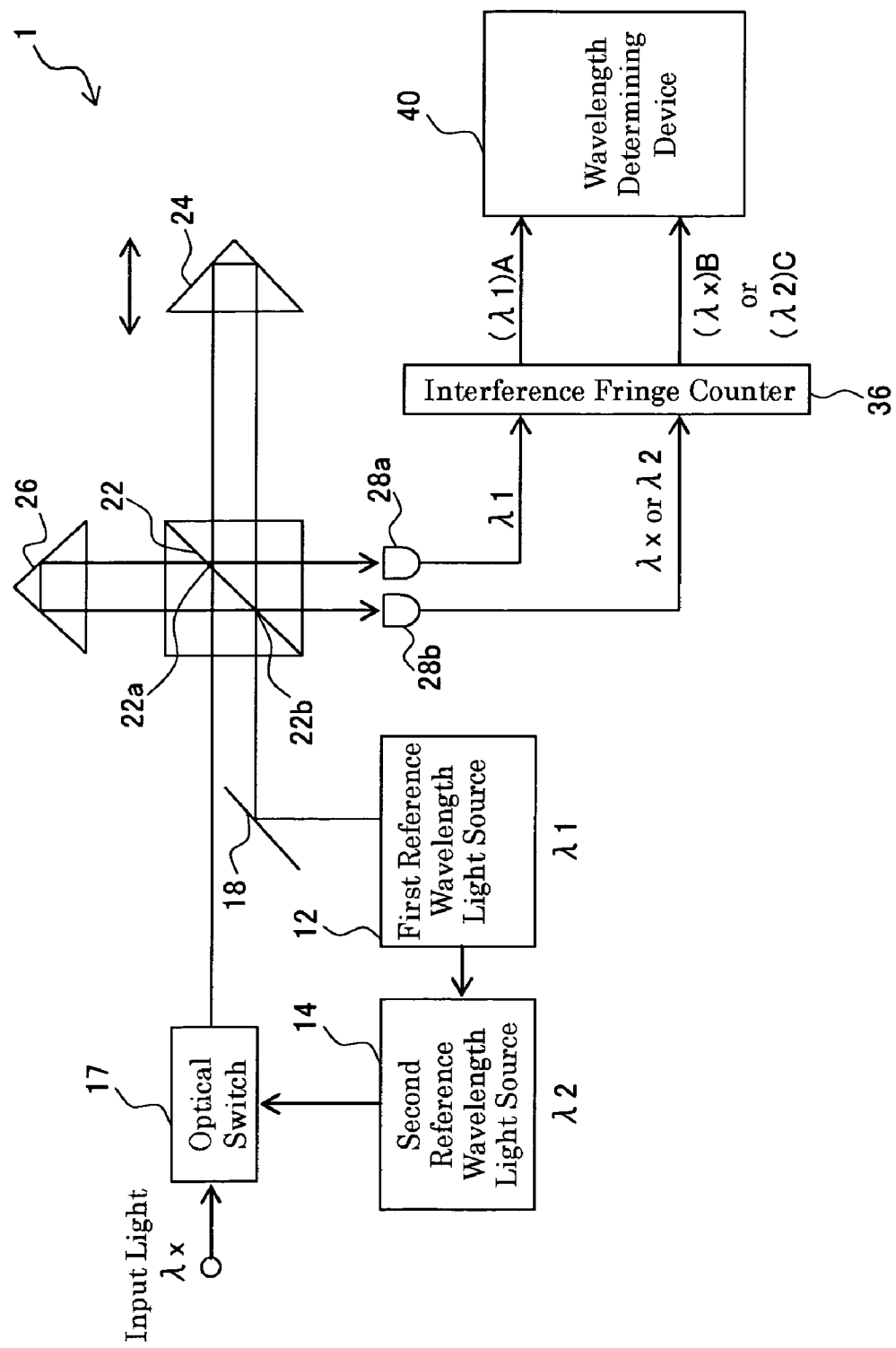
FIG. 7 is a diagram showing a configuration of the wavelength meter 1 according the third embodiment of the present invention.

FIG. 7 is a diagram showing a configuration of the wavelength meter 1 according to the third embodiment of the present invention. The wavelength meter 1 according to the third embodiment is provided with a first reference wavelength light source 12, a second reference wavelength light source 14, the optical switch 17, an incident mirror 18, a half mirror 22, a movable reflecting mirror 24, a fixed reflecting mirror 26, photo diodes 28a, 28b, an interference fringe counter 36, and a wavelength determining device 40. In the following section, like components are denoted by like numerals as of the first embodiment, and will be explained in no more details.

The first reference wavelength light source 12 and the second reference wavelength source 14 are similar to those in the first embodiment, and a description thereof, therefore, is omitted.

The optical switch 17 receives the second reference wavelength light and the input light, and outputs either of them.

The half mirror 22, the movable reflecting mirror 24, and the fixed reflecting mirror 26 are almost similar to those according to the first embodiment. However, the input light or the second reference wavelength light is received at a first reflecting point 22a.

The optical path difference L is generated in the first reference wavelength light and the output from the optical switch 17 by the half mirror 22, the movable reflecting mirror 24, and the fixed reflecting mirror 26. Namely, the half mirror 22, the movable reflecting mirror 24, and the fixed reflecting mirror 26 function as an optical path difference generator. It should be noted that the mechanism which generates the optical path difference L is not limited to a Michelson interferometer, and may be a Fizeau interferometer, for example, which is the same as the first embodiment.

The photo diode 28a is similar to that in the first embodiment, and a description thereof, therefore, is omitted. The photo diode 28b receives interference fringes generated at a second reflecting point 22b of the half mirror 22, and converts the interference fringes into an electric signal. The electric signal output by the photo diode 28b is a signal based upon the second reference wavelength light (signal based upon the light with the wavelength $\lambda 2$) or a signal based upon the input light (signal based upon the light with the wavelength $\lambda x$).

The interference fringe counter 36 receives the electric signals from the photo diodes 28a and 28b to count the numbers of the interference fringes. A number A of the interference fringes generated by the optical path difference L of the first reference wavelength light is counted based upon the electric signal received from the photo diode 28a. A number B of the interference fringes generated by the optical path difference L of the input light, or a number C of the interference fringes generated by the optical path difference L of the second reference wavelength light is counted based upon the electric signal received from the photo diode 28b.

A configuration of the wavelength determining device 40 is similar to that in the first embodiment, and a description thereof, therefore, is omitted.

Figure 8:
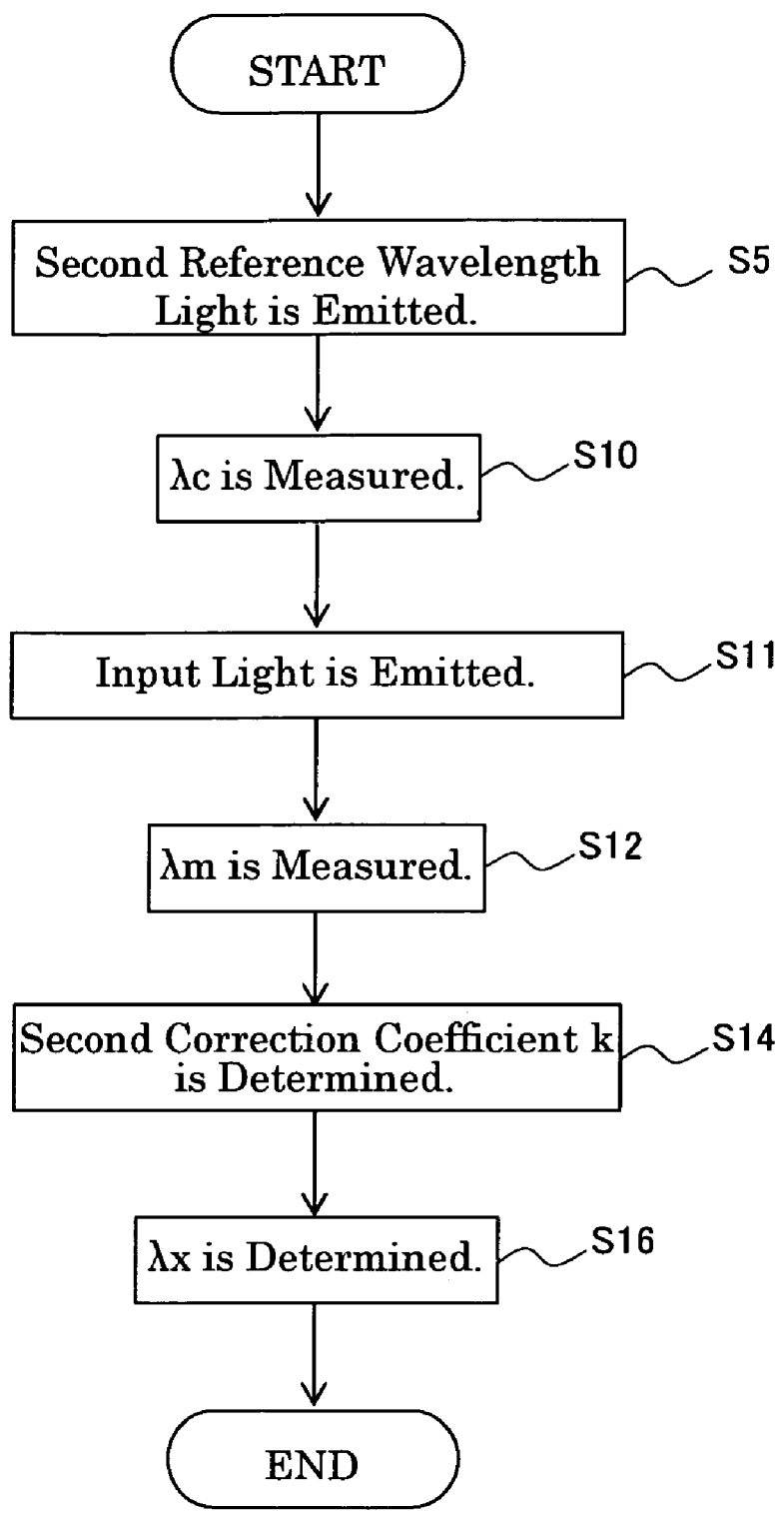
FIG. 8 is a flowchart showing an operation of the third embodiment of the present invention.

A description will now be given of an operation of the third embodiment of the present invention with reference to a flowchart in FIG. 8.

The first reference wavelength light source 12 emits the first reference wavelength light (wavelength: $\lambda 1$). The first reference wavelength light is reflected by the incident mirror 18, and is made incident on the second reflecting point 22b of the half mirror 22.

Moreover, the first reference wavelength light is also supplied to the second reference wavelength light source 14, which is an SHG. The second reference wavelength light source 14 emits the second reference wavelength light (wavelength: $\lambda 2 = \lambda 1; 2$). On this occasion, the optical switch 17 emits the second reference wavelength light (S5). The second reference wavelength light is made incident on the first reflecting point 22a of the half mirror 22.

The half mirror 22 receives the second reference wavelength light at the first reflecting point 22a. A half of the second reference wavelength light transmits the half mirror 22, and is supplied to the movable reflecting mirror 24. The rest half of the second reference wavelength light is reflected by the half mirror 22, and is supplied to the fixed reflecting mirror 26.

Moreover, the half mirror 22 receives the first reference wavelength light at the second reflecting point 22b. A half of the first reference wavelength light transmits the half mirror 22, and is supplied to the movable reflecting mirror 24. The rest half of the first reference wavelength light is reflected by the half mirror 22, and is supplied to the fixed reflecting mirror 26.

The movable reflecting mirror 24 reflects the second reference wavelength light which has transmitted the half mirror 22, and supplies the second reflecting point 22b of the half mirror 22 with the second reference wavelength light. Moreover, the movable reflecting mirror 24 reflects the first reference wavelength light which has transmitted the half mirror 22, and supplies the first reflecting point 22a of the half mirror 22 with the first reference wavelength light.

The fixed reflecting mirror 26 reflects the second reference wavelength light which has been reflected by the half mirror 22, and supplies the second reflecting point 22b of the half mirror 22 with the second reference wavelength light. Moreover, the fixed reflecting mirror 26 reflects the first reference wavelength light which has been reflected by the half mirror 22, and supplies the first reflecting point 22a of the half mirror 22 with the first reference wavelength light.

It should be noted that the optical path difference L is generated in the first reference wavelength light and the second reference wavelength light by the half mirror 22, the movable reflecting mirror 24, and the fixed reflecting mirror 26.

As a result, the interference fringes of the first reference wavelength light are generated at the first reflecting point 22a. Moreover, the interference fringes of the second reference wavelength light are generated at the second reflecting point 22b.

The photo diode 28a receives the interference fringes of the first reference wavelength light generated at the first reflecting point 22a of the half mirror 22, and converts the interference fringes into the electric signal. The photo diode 28b receives interference fringes of the second reference wavelength light generated at the second reflecting point 22b of the half mirror 22, and converts the interference fringes into the electric signal.

The interference fringe counter 36 receives the electric signals from the photo diodes 28a and 28b to count the numbers of the interference fringes. The number A of the interference fringes generated by the optical path difference L of the first reference wavelength light is counted based upon the electric signal received from the photo diode 28a. The number C of the interference fringes generated by the optical path difference L of the second reference wavelength light is counted based upon the electric signal received from the photo diode 28b. The counted numbers of the interference fringes A and C are supplied to the wavelength determining device 40.

A reference wavelength measuring section 42 measures the wavelength of the second reference wavelength light based upon the numbers A and C of the interference fringes (S10). The measured result $\lambda c$ is represented by the equation (1).

Then, the optical switch 17 emits the input light (S11). The input light is made incident on the first reflecting point 22a of the half mirror 22.

The half mirror 22 receives the input light at the first reflecting point 22a. A half of the input light transmits the half mirror 22, and is supplied to the movable reflecting mirror 24. The rest half of the input light is reflected by the half mirror 22, and is supplied to the fixed reflecting mirror 26.

Moreover, the half mirror 22 receives the first reference wavelength light at the second reflecting point 22b. A half of the first reference wavelength light transmits the half mirror 22, and is supplied to the movable reflecting mirror 24. The rest half of the first reference wavelength light is reflected by the half mirror 22, and is supplied to the fixed reflecting mirror 26.

The movable reflecting mirror 24 reflects the input light which has transmitted the half mirror 22, and supplies the second reflecting point 22b of the half mirror 22 with the input light. Moreover, the movable reflecting mirror 24 reflects the first reference wavelength light which has transmitted the half mirror 22, and supplies the first reflecting point 22a of the half mirror 22 with the first reference wavelength light.

The fixed reflecting mirror 26 reflects the input light which has been reflected by the half mirror 22, and supplies the second reflecting point 22b of the half mirror 22 with the input light. Moreover, the fixed reflecting mirror 26 reflects the first reference wavelength light which has been reflected by the half mirror 22, and supplies the first reflecting point 22a of the half mirror 22 with the first reference wavelength light.

It should be noted that the optical path difference L is generated in the first reference wavelength light and the input light by the half mirror 22, the movable reflecting mirror 24, and the fixed reflecting mirror 26.

As a result, the interference fringes of the first reference wavelength light are generated at the first reflecting point 22a. Moreover, the interference fringes of the input light are generated at the second reflecting point 22b.

The photo diode 28a receives the interference fringes of the first reference wavelength light generated at the first reflecting point 22a of the half mirror 22, and converts the interference fringes into the electric signal. The photo diode 28b receives interference fringes of the input light generated at the second reflecting point 22b of the half mirror 22, and converts the interference fringes into the electric signal.

The interference fringe counter 36 receives the electric signals from the photo diodes 28a and 28b to count the numbers of the interference fringes. The number A of the interference fringes generated by the optical path difference L of the first reference wavelength light is counted based upon the electric signal received from the photo diode 28a. The number B of the interference fringes generated by the optical path difference L of the input light is counted based upon the electric signal received from the photo diode 28b. The counted numbers of the interference fringes A and B are supplied to the wavelength determining device 40.

An input light wavelength measuring section 44 measures the wavelength of the input light based upon the numbers A and B of the interference fringes (S12). The measured result $\lambda m$ is represented by the equation (2).

A correction coefficient determining section 46 receives $\lambda c$ from the reference wavelength measuring section 42, receives $\lambda m$ from the input light wavelength measuring section 44, and determines the second correction coefficient k (S14). The second correction coefficient k is represented by the equation (10). It should be noted that $P=((\lambda 2/\lambda c)-1)/(\lambda 2-\lambda 1)$.

Finally, an input light wavelength correcting section 48 multiplies $\lambda m$ by the second correction coefficient k to determine $\lambda x$ (S16).

According to the third embodiment of the present invention, there are obtained effects as those of the first embodiment. Moreover, the demultiplexer 32 can be eliminated.

It should be noted that the above-described embodiments may be realized in the following manner. Namely, a computer is provided with a CPU, a hard disk, and a media (such as a floppy disk (registered trade mark) and a CD-ROM) reader, and the media reader is caused to read a medium recording a program realizing the above-described respective parts (such as the reference wavelength measuring section 42, the input light wavelength measuring section 44, the correction coefficient determining section 46, and the input light wavelength correcting section 48), thereby installing the program upon the hard disk. This method may also realize the above-described embodiments.

What is claimed is:

1. A wavelength determining apparatus comprising:
a reference wavelength measurer that measures a wavelength of second reference wavelength light based upon a number of interference fringes generated by an optical path difference of first reference wavelength light, and a number of interference fringes generated by the optical path difference of the second reference wavelength light;
an input light wavelength measurer that measures a wavelength of input light based upon the number of interference fringes generated by the optical path difference of the first reference wavelength light, and a number of interference fringes generated by the optical path difference of the input light;
a correction coefficient determiner that determines a correction coefficient based upon the measured wavelength of the second reference wavelength light and the measured wavelength of the input light; and
an input light wavelength corrector that corrects the measured wavelength of the input light by multiplying the measured wavelength of the input light by the correction coefficient.

2. The wavelength determining apparatus according to claim 1, wherein:
the correction coefficient is 1 when the wavelength of the input light is equal to the wavelength of the first reference wavelength light.

3. A wavelength meter comprising:
said wavelength determining apparatus according to claim 1;
a first reference wavelength light source that emits the first reference wavelength light;
a second reference wavelength light source that emits the second reference wavelength light;
a coupler that couples the second reference wavelength light and the input light to each other;
an optical path difference generator that generates the optical path difference in the first reference wavelength light and an output from said coupler; and
a demultiplexer that demultiplexes a signal based upon an output corresponding to the output from said coupler of outputs from said optical path difference generator into a signal based upon the second reference wavelength light and a signal based upon light with a wavelength other than the wavelength of the second reference wavelength light.

4. A wavelength meter comprising:
said wavelength determining apparatus according to claim 1;
a first reference wavelength light source that emits the first reference wavelength light;
a second reference wavelength light source that emits the second reference wavelength light;
an optical switch that outputs either the second reference wavelength light or the input light; and
an optical path difference generator that generates the optical path difference in the first reference wavelength light and the output from said optical switch.

5. A wavelength meter comprising:
said wavelength determining apparatus according to claim 1;

a first reference wavelength light source that emits the first reference wavelength light;

a second reference wavelength light source that emits the second reference wavelength light;

a coupler that couples the first reference wavelength light and the second reference wavelength light to each other;

an optical path difference generator that generates the optical path difference in the input light and an output from said coupler; and a demultiplexer that demultiplexes a signal based upon an output corresponding to the output from said coupler of outputs from said optical path difference generator into a signal based upon the first reference wavelength light and a signal based upon the second reference wavelength light.

6. A wavelength meter comprising:

said wavelength determining apparatus according to claim 1;

a first reference wavelength light source that emits the first reference wavelength light;

a second reference wavelength light source that emits the second reference wavelength light;

a coupler that couples the second reference wavelength light and the input light to each other;

an optical path difference generator that generates the optical path difference in the first reference wavelength light and an output from said coupler; and a demultiplexer that demultiplexes an output corresponding to the output from said coupler of outputs from said optical path difference generator into the second reference wavelength light and light with a wavelength other than the wavelength of the second reference wavelength light.

7. A wavelength meter comprising:

said wavelength determining apparatus according to claim 1;

a first reference wavelength light source that emits the first reference wavelength light;

a second reference wavelength light source that emits the second reference wavelength light;

a coupler that couples the first reference wavelength light and the second reference wavelength light to each other;

an optical path difference generator that generates the optical path difference in the input light and an output from said coupler; and a demultiplexer that demultiplexes an output corresponding to the output from said coupler of outputs from said optical path difference generator into the first reference wavelength light and the second reference wavelength light.

8. The wavelength meter according to claim 3, wherein: the wavelength of the second reference wavelength light is determined based upon the wavelength of the first reference wavelength light.

9. The wavelength meter according to claim 8, wherein: said second reference wavelength light source is an optical frequency multiplier that receives the first reference wavelength light.

10. The wavelength meter according to claim 9, further comprising:

a reference wavelength cell which receives the light emitted from said second reference wavelength light source, and absorbs light with a predetermined wavelength; and a controller that controls the wavelength of the light emitted from said first reference wavelength light source according to a difference between the wavelength of the light emitted from said second reference wavelength light source and the predetermined wavelength.

11. A wavelength determining method comprising:

measuring a wavelength of second reference wavelength light based upon a number of interference fringes generated by an optical path difference of first reference wavelength light, and a number of interference fringes generated by the optical path difference of the second reference wavelength light;

measuring a wavelength of input light based upon the number of interference fringes generated by the optical path difference of the first reference wavelength light, and a number of interference fringes generated by the optical path difference of the input light;

determining a correction coefficient based upon the measured wavelength of the second reference wavelength light and the measured wavelength of the input light; and correcting the measured wavelength of the input light by multiplying the measured wavelength of the input light by the correction coefficient.

12. A program of instructions for execution by the computer to perform a wavelength determining process; said wavelength determining process comprising:

measuring a wavelength of second reference wavelength light based upon a number of interference fringes generated by an optical path difference of first reference wavelength light, and a number of interference fringes generated by the optical path difference of the second reference wavelength light;

measuring a wavelength of input light based upon the number of interference fringes generated by the optical path difference of the first reference wavelength light, and a number of interference fringes generated by the optical path difference of the input light;

determining a correction coefficient based upon the measured wavelength of the second reference wavelength light and the measured wavelength of the input light; and correcting the measured wavelength of the input light by multiplying the measured wavelength of the input light by the correction coefficient.

13. A computer-readable medium having a program of instructions for execution by the computer to perform a wavelength determining process; said wavelength determining process comprising:

measuring a wavelength of second reference wavelength light based upon a number of interference fringes generated by an optical path difference of first reference wavelength light, and a number of interference fringes generated by the optical path difference of the second reference wavelength light;

measuring a wavelength of input light based upon the number of interference fringes generated by the optical path difference of the first reference wavelength light, and a number of interference fringes generated by the optical path difference of the input light;

determining a correction coefficient based upon the measured wavelength of the second reference wavelength light and the measured wavelength of the input light; and correcting the measured wavelength of the input light by multiplying the measured wavelength of the input light by the correction coefficient.

* * * * *